Sept. 9, 1924.  
J. FARLEY  
CHANGE SPEED MECHANISM  
Filed June 28, 1924  
1,507,819  
3 Sheets-Sheet 1
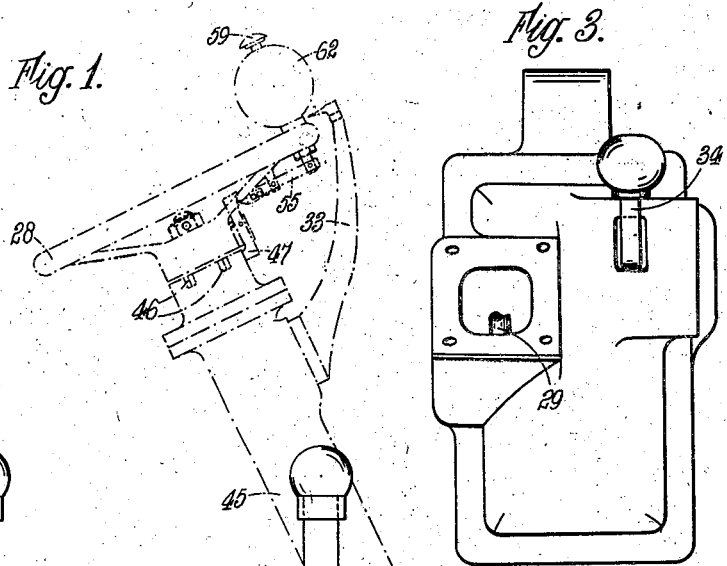
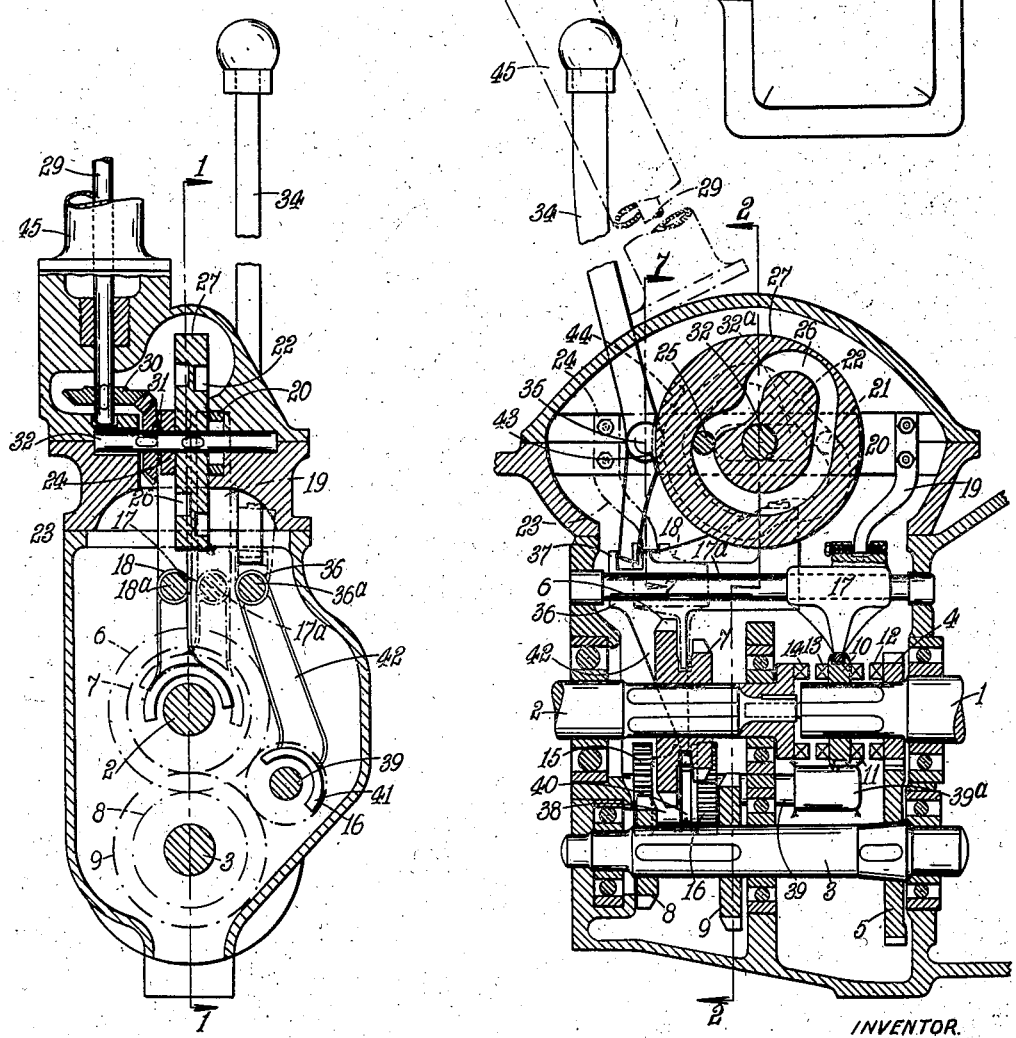
INVENTOR.  
J. FARLEY  
per: Sydney E. Page  
Attorney Sept. 9, 1924.
J. FARLEY
CHANGE SPEED MECHANISM
Filed June 28, 1924   3 Sheets-Sheet 2
1,507,819
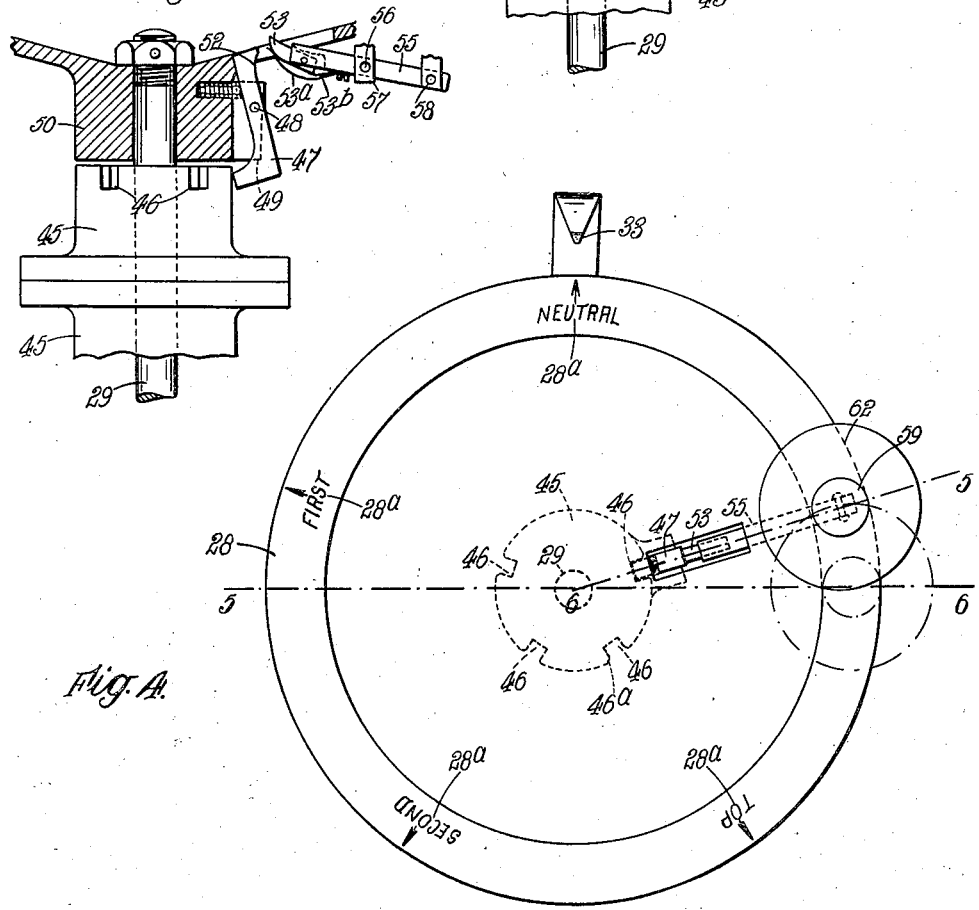
INVENTOR.
J. FARLEY
per Sydney E Page
Attorney.

Sept. 9, 1924.
J. FARLEY
1,507,819
CHANGE SPEED MECHANISM
Filed June 28, 1924   3 Sheets-Sheet 3
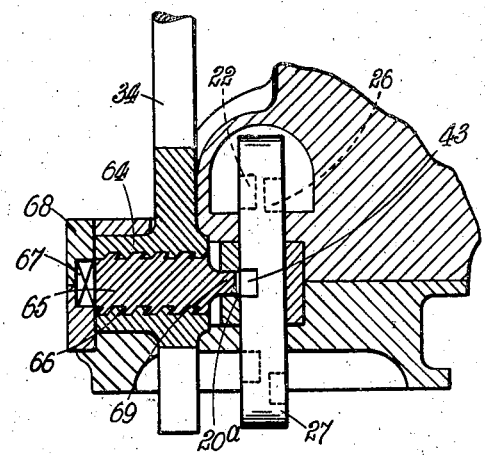
Fig.9.
Fig.8.
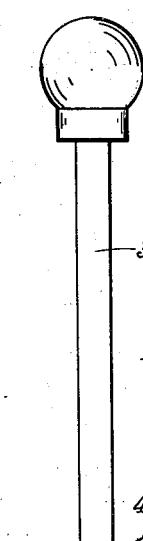
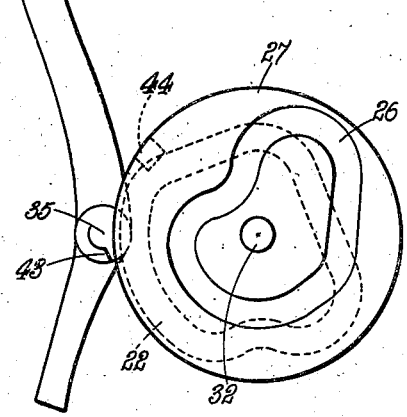
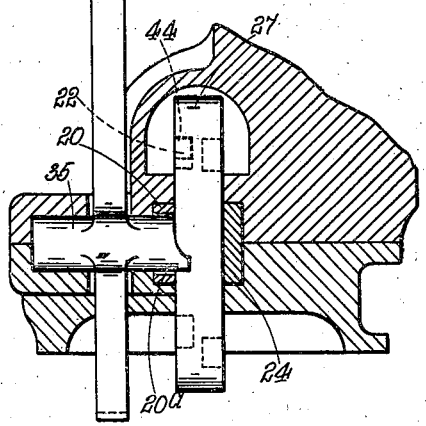
Fig.7.
INVENTOR
J. FARLEY
per: Sydney E. Page
Attorney Patented Sept. 9, 1924.

1,507,819

UNITED STATES PATENT OFFICE.

JAMES FARLEY, OF HERTFORDSHIRE, ENGLAND.

CHANGE-SPEED MECHANISM.

Application filed June 28, 1924. Serial No. 723,045.

*To all whom it may concern:*

Be it known that I, JAMES FARLEY, a subject of the King of Great Britain, residing at Hertfordshire, England, have invented certain new and useful Improvements in Change-Speed Mechanism, of which the following is a specification.

This invention relates to improvements in change speed mechanism arranged more particularly for motor vehicles, but applicable also to other purposes where changes of speed are desired.

The main object of the invention is to provide improved means to prevent damage to gears during changes by effecting engagement of gears in the absence of torque on the lay shaft. Another object is to construct a gear so that the known advantage of a direct drive in the absence of rotation of the lay shaft is obtained. A further object is to frustrate an attempt to change to a forward drive when the reverse gears are in mesh by locking the gear change control when reverse gears are in operative position. A further object is to provide means to facilitate changes of gears by indicating the required position of control so as to effect the required change. A still further object is to provide means for temporarily securing the control when in any of the required positions for various speed changes as soon as it is moved into that position, thereby preventing over-running of the change required.

In the accompanying drawings is illustrated a preferred embodiment of the invention as arranged for the gear box of a motor-car.

Fig. 1 is a section on the line 1—1 of Fig. 2, the portion shown in dot and pick lines indicating parts in front of the plane of the section in order to render the reading of the figure more clear;

Fig. 2 is a section on the line 2—2 of Fig. 1, the portion shown in dot and pick lines indicating parts in front of the plane of the section in order to render the reading of the figure more clear;

Fig. 3 is a plan view indicating the relative positions of the control handle and reversing lever as hereafter referred to;

Fig. 4 is a plan view of a control handle in the form of a wheel provided with a trip gear which operates to temporarily secure the control wheel in the proper positions for effecting the various gear changes;

Fig. 5 is a sectional elevation taken on the line 5—5 of Fig. 4, showing engagement of the trip gear with the head of the notched column hereafter referred to;

Fig. 6 is a similar view to Fig. 5 showing the relative position of the trip gear and co-operating notched column when the control wheel has been partly rotated for a gear change to the position indicated by the line 6—6 in Fig. 4;

Fig. 7 is a sectional elevation taken on the line 7—7 of Fig. 1, and illustrates a means of locking the gear against a forward change when the reverse gear is in operation, the independent control lever included in this figure being shown in full for sake of clearness;

Fig. 8 is a diagrammatic view in side elevation of the construction shown in Fig. 7, thereby more clearly showing the arrangement indicated in Fig. 1; and Fig. 9 is a similar view to Fig. 7 showing a modified arrangement.

Referring first to Figs. 1, 2, and 3, the engine shaft, or driver, as it is hereafter referred to, is indicated by the reference 1, the second motion or driven shaft by the reference 2, and the lay shaft by the reference 3. The shafts 1 and 3 are connected by constant mesh gear, including a loose wheel 4 on the driver and a fixed wheel 5 on the lay shaft. On the driven shaft is provided two toothed wheels of different sizes, indicated by the references 6 and 7. These wheels 6 and 7 are connected together and are slidable on the driven shaft, as hereafter explained. On the lay shaft are fixed two toothed wheels 8 and 9; the wheels 6 and 8 form one pair of wheels for a gear change, and the wheels 7 and 9 a second pair. By sliding the wheels 6 and 7 on the driven shaft 2, either 6 will engage with 8, or 7 will engege with 9, and if power has been transmitted to the lay shaft, a corresponding gear drive will be obtained from the driven shaft 2.

On the driver is mounted a sliding clutch member 10 which is provided with dog clutches 11 on one side, forming a complementary face to engage with the clutch face 12 of the loose wheel 4; the sliding clutch member 10 is of course fixed for rotation with the driver, so that when its dogs 11 engage with the dogs on the clutch face 12, power is transmitted to the lay shaft. On the other side of the clutch member 10 to the dogs 11 are dogs 13, and the driven shaft is provided with complementary dogs 14. When the dogs 13 engage the dogs 14, a direct drive is obtained from the driver 1 to the driven shaft 2, and in such case it will be noted that the lay shaft is stationary because the clutch cannot engage the loose wheel 4.

For the purpose of obtaining a reverse transmission drive two idler wheels are provided, indicated by the references 15 and 16; these idler wheels are fixed for rotation together, and are slidably arranged on a guide shaft hereafter referred to. A reverse drive is obtained by first arranging the wheels 6, 7 in the neutral position shown in Fig. 1, that is, the position in which the wheels do not engage either of the wheels 8 or 9, and then the wheels 15 and 16 are slid to the right so that the wheel 16 engages the wheel 9 and the wheel 15 engages the wheel 6. Supposing then the clutch has been moved so that the dogs 11 engage the clutch face 12 of the loose wheel 4, power will be transmitted from 1, through 4, 5, shaft 3, wheels 9, 16, 15, 6, and driven shaft 2. During a forward drive involving the meshing of the wheels 6 and 8, the idlers will also be rotated, as in this position of the gear the idler 15 is in mesh with the wheel 8.

Now, as before stated, a gear drive is obtained by moving the wheels 6, 7 to engage the wheels 8 or 9 in the absence of torque on the lay shaft. To this end an operating member 17 for the clutch and a shifting member 18 for the gears 6, 7 are provided; these clutch-operating and gear-shifting members are slidably arranged on guides 17ª and 18ª respectively, and in order to slide the clutch-operating and gear-shifting members on their respective guides, as required, controlling means are provided, comprising strikers fixed to bars operated by cams. The operating member 17 is connected by a striker 19 to a bar 20 carrying a bowl 21 operated by the cam 22, and the shifting member 18 is connected by a striker 23 to a bar 24 which carries a bowl 25 operated by the cam 26.

In the construction shown the cams 22 and 26 are what are known as railway cams, and one is provided on each face of a disc 27 so that as the disc 27 is rotated each of the cams will also be equally angularly moved, each imparting a specific movement to the respective bars through the agency of the bowls 21 and 25, as will be readily understood.

The cams 22 and 26 are formed so that the gears 6 and 7 are moved to their respective gear pairs 8 and 9 while the dogs 11 of the clutch member 10 are out of engagement with the clutch face 12 of the loose wheel 4, and further, to hold the gears 6 and 7 in neutral position as shown in Fig. 1 when a reverse drive is required or when a direct drive is desired; therefore the cam operating the member 17 is desired to move the clutch from an " in " position of direct drive (that is when 13 engages 14) through an intermediate " out " position (which is the position shown in Fig. 1, that is 13 is free of 14 and 11 is free from the clutch face 12), to an " in " position where the dogs 11 engage the clutch face 12.

Now in order to rotate the disc 27 to obtain the gear change required the controlling means of the clutch-operating and gear-shifting members includes further a handle preferably in the form of a wheel, as indicated at 28. This wheel is mounted on a spindle 29 which is connected by transmission gears in the form of bevels 30, 31 to an axis member 32 on which is fixed the disc 27. As the axis member 32 has to pass through the bars 20 and 24 the latter are slotted, as indicated at 32ª in Fig. 1 in order that their movements are not obstructed.

The wheel 28 is marked as indicated at 28ª in Fig. 4, and an indicator 33 is provided so that the operator is shown the proper positions of the wheel by registering the markings with the indicator; the markings for the gear illustrated will be as shown in Fig. 4, that is, with the words " Top," " Second," " First," and " Neutral," and the gear indicator 33 is disposed so that the wheel is movable with reference to the indicator.

In order to obtain the reverse drive the wheels 15 and 16 are provided with an independent control, preferably in the form of a lever, as indicated by the reference 34, disposed to the side of the controlling wheel 28 (see Figs. 1 to 3). This lever is pivoted at 35 and its pivot extends through the bar 20, and accordingly therefore the bar 20 must be further slotted as indicated at 20ª (Fig. 7) in order to allow the bar to move under effort from its respective cam. The independent control 34 is connected to the wheels 15 and 16 in the following manner:—

A sliding member 36 is mounted on a guide 36ª which is juxtaposed and parallel to the aforementioned guides 17ª and 18ª (see Fig. 2); the sliding member has lugs 37 on its upper part in which the lower end of the lever 34 engages, so that as the lever 34 is rocked about its pivot 35 the sliding member 36 is moved to and fro along its guide 36ª. The wheels 15 and 16 are formed at opposite ends of a cylindrical member 38 slidable on the guide shaft 39, the cylindrical member being grooved, as indicated at 40, for the reception of a sector 41 formed at the lower extremity of an arm 42 depending from the sliding member 36; as the sector engages in the groove 40 movements of the sliding member are imparted to the wheels 15 and 16.

Previous to operating the reversing lever 34 the wheel 28 will be rotated to the position in which the wheels 6 and 7 are in "neutral" and the dogs 11 engage the clutch face of the loose wheel 4. The lever 34 is then operated to engage 16 with 9 and 15 with 6. Now in order to prevent a movement of the cams when the idlers are in the position for reverse as just stated, a locking device is provided which preferably takes the form of a projection 43 on the control lever and a recess 44 on the disc, the recess being disposed so that as the lever is moved to reverse, the projection 43 enters the recess 44 and locks the disc against movement until the lever 34 has again been moved to place the idlers 15 and 16 out of operative position.

From the foregoing description the operation of the gear will be well understood; however, it is pointed out that the mark "Top" on the wheel 28 corresponds to direct drive position of the gear, and the mark "Neutral" corresponds to reverse drive position, that is to say, when the mark "Top" is underneath the indicator 33 the wheels 6 and 7 will be in the position shown in Fig. 1 and the dogs 13 and 14 engaged, while in the "neutral" position the gears 6 and 7 will be in the position shown in Fig. 1, but the dogs 11 engage with the clutch face 12 so that the lay shaft is rotating. In this position the recess 44 is in position for locking the disc 27 as before stated.

As already explained it is preferred to associate with the control wheel 28 an indicator so that the operator can see the exact positions for the wheel to obtain the desired changes.

Now in order to prevent the operator over-running the positions and therefore passing through a desired change a trip gear is provided. The spindle 29 is mounted in a fixed column 45 and the head of the column is notched as indicated at 46 (Figs. 4 to 6). The notches 46 are arranged on the head of the column so that when a catch 47 carried by the wheel 28 is in one of the notches the respective marking 28ª on the wheel will be opposite the indicator 33. The catch 47 is pivoted at 48 between lugs 49 on a boss 50 of the wheel 28, the pivot being arranged so that when the catch 47 is in the vertical position it engages one of the notches 46, as indicated in Fig. 5. This position of engagement is ensured by a spring 51 which is disposed and tensioned so that it tends to push the catch into the notches. That end of the catch which is on the other side of the pivot 48 to the notch 46 is provided with a cam face 52 and in order to move the catch so as to release it from a notch a nose member 53 is pivoted at 54 on a second lever 55, the pivot 56 of the latter being carried in brackets 57 formed on the underside of the wheel 28, the forward part of the lever 55 being slotted out to form a housing for the member 53.

The nose member 53 is provided with springs 53ª and 53ᵇ, the spring 53ª engaging the nose of the member; the normal position of the spring pressed nose member 53 is shown in Figs. 5 and 6, that is, the nose member 53 is tilted in relation to the lever 55, while the spring 53ᵇ engages the other end or heel of the member as hereafter explained. That end of the lever 55 away from the member 53 is connected to a push rod 58 having a knob 59 by which it is operated against a spring 60 secured between the knob and a bearing sleeve 61 for the rod 58.

The knob 59 is provided on its underside with a stop 59ª, which limits the downward movement of the rod by engaging the upper face 62ª of the protecting ball 62, which is screwed on to the sleeve 61, as clearly shown in Fig. 5. It will be noted that the ball is hollowed out, as indicated at 63, to form a housing for the spring 60.

The arrangement and disposition of the nose member 53 and cam face 52 of the catch 47 and of the distance between the stop 59ª and the face 62ª of the ball 62 is such that when the rod has been depressed to its full extent, that is, so that the stop 69ª is resting on the face 62ª, the nose of the member 53 will have been passed up part of the cam face 52 so as to rock the catch 47 until it is nearly clear of the notch 46 with which it is engaged, and in passing up to this position the member 53 will come into alignment with the lever 55 because of the engagement of its nose with the cam face 52 against the action of the spring 51. This movement of the nose member 53 tensions the spring 53ª with which it engages. In this position, the nose of the member 53 remaining in engagement with the cam face 52 prevents the return of the catch 47 into the notch 46 under action of the spring 51. It, therefore, does not matter if the wheel 28 is not immediately rotated while the knob 59 is maintained pressed. The sides of the notches 46 are chamfered off, as indicated by the reference 46ª in Fig. 4, the chamfer extending inwardly to the notch so that the catch is at the beginning of the chamfer when it is held in tilted position by the member 53 on the depression of the knob 59. Then, as the wheel 28 is rotated, the catch 47 is caused to ride over the chamfered face 46ª out of the notch. The position of the parts is then as indicated in Fig. 6, and it will be noticed that the nose of the member 53 is now above the cam face 47 and is again tilted in relation to the lever 55. This is due to the action of the spring 53ª which was put in tension as the member 53 passed over the cam face 52. The catch 47 is, therefore, free to return under the action of the spring 51 when a notch 46 is again in register with the catch 47.

It will be appreciated that as soon as the wheel 28 has been rotated so as to bring the catch 47 out of a notch 46, the knob 59 can be released, and in such a condition of affairs the nose member 53 and lever 55 may again automatically attain the normal position shown in Fig. 5 due to the action of the spring 60, and even if the knob 59 is held down until the catch 47 is engaged with the next successive notch 46. The member 53 can pass the cam face 52, when the knob is released, due to its pivotal arrangement on the lever 55; and in this movement the spring 53ᵇ comes into action. As the member 53 re-engages the cam face 52 it is further tilted about its pivot 54 because the catch 47 is then vertical and this additional movement of the member 53 brings its heel into engagement with the spring 53ᵇ so that then the spring is tensioned and tends to return the nose member to its initial position.

With such an arrangement a step by step movement of the control wheel through its operative positions is assured, and after each movement the nose member 53 and lever 55 are in the initial position shown in Fig. 5, ready on the operation of the knob 59 to again rock the catch free of the notch with which it is engaged.

In order to simplify, in Fig. 6, the illustration of the parts after the catch has ridden over a chamfered face 46ª of a notch 46, the head of the column 45 has been illustrated as if it had been rotated instead of the wheel 28, thereby avoiding confusion in illustrating the movement of the parts 47, 53 and 55 from the position shown in Fig. 5.

It will, therefore, be clear that in order to move the control wheel the operator has to deliberately depress the knob 59 and then the wheel can only be moved to the next gear position because the catch will engage the next successive notch. To further move the wheel, therefore, the operator has again to deliberately depress the knob 59, and so on.

The trip gear, therefore, assures that the wheel is moved in the required position for a desired gear change, and further, is held in that position so that over-running of the control is prevented. The trip gear also prevents inadvertent movement of the hand wheel while a gear pair is in operation, or when any particular gear is running.

Referring now to Fig. 9, this shows a modified construction for locking the disc 27 when the gears 6, 7 and the clutch member 10 are in position when the lever 34 can be operated for a reverse drive. In this modified construction the lever 34 is provided with a boss 64 which is internally threaded to receive a spindle 65 which is externally provided with a quick action thread 66. The outer end of the spindle is provided with a square head 67 disposed in a locking plate 68 by which the spindle is secured against rotation but is free to move longitudinally. The inner end of the spindle 65 is provided with a pin 69, the arrangement being such that a rotation of the lever 34 causes an axial displacement of the spindle 65 causing the pin 69 of the latter to enter the recess 43 on the disc 27.

The reference 39ª (Fig. 1) indicates a bearing support for the guide shaft 39, the other end of which is carried in the wall of the gear casing.

The shafts 1 and 2 are spigot jointed as is well known in the art, as indicated in Fig. 1, and accordingly, therefore, further description is not required.

I claim:—

1. Change speed mechanism having in combination a driver shaft, a driven shaft, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a clutch, an operating member for the clutch to move it into and out of engagement with the clutch face of the loose wheel, and controlling means for the clutch-operating and gear-shifting members assuring engagement of the said pair of wheels as a preliminary to the engagement of said clutch and loose wheel, whereby the said pair of wheels engage in the absence of torque on the lay shaft.

2. Change speed mechanism having in combination a driver shaft, a driven shaft, a clutch adapted to directly connect said shafts, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, and controlling means for the clutch-operating and gear-shifting members assuring engagement of the said pair of wheels as a preliminary to the engagement of said clutch and loose wheel, whereby the said pair of wheels engage in the absence of torque on the lay shaft.

3. Change speed mechanism having in combination a driver shaft, a driven shaft, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby, and a striker carried by each bar, the striker of one bar being connected to the gear-shifting member and the striker of the other bar being connected to the clutch-operating member, whereby the engagement of said pair of wheels is preliminary to the engagement of the clutch and loose wheel.

4. Change speed mechanism having in combination a driver shaft, a driven shaft, a clutch adapted to directly connect said shafts, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby and a striker carried by each bar, the striker of one bar being connected to the gear-shifting member and the striker of the other bar being connected to the clutch-operating member, whereby the engagement of said pair of wheels is preliminary to the engagement of the clutch and loose wheel.

5. Change speed mechanism having in combination a driver shaft, a driven shaft, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means for the clutch-operating and gear-shifting members assuring engagement of the said pair of wheels as a preliminary to the engagement of said clutch and loose wheel, whereby the said pair of wheels engage in the absence of torque on the lay shaft reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for a reverse drive.

6. Change speed mechanism having in combination a driver shaft, a driven shaft, a clutch adapted to directly connect said shafts, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means for the clutch-operating and gear-shifting members assuring engagement of the said pair of wheels as a preliminary to the engagement of said clutch and loose wheel, whereby the said pair of wheels engage in the absence of torque on the lay shaft, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for a reverse drive.

7. Change speed mechanism having in combination a driver shaft, a driven shaft, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, whereby the engagement of said pair of wheels is preliminary to the engagement of the clutch and loose wheel, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for a reverse drive.

8. Change speed mechanism having in combination a driver shaft, a driven shaft, a clutch adapted to directly connect said shafts, a lay shaft, a pair of gear wheels including one wheel on the lay shaft and the other on the driven shaft, a shifting member for obtaining relative movement into and out of engagement between the wheels of the pair, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, whereby the engagement of said pair of wheels is preliminary to the engagement of the clutch and loose wheel, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for a reverse drive.

9. Change speed mechanism having in combination a driver shaft, a driven shaft, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means functioning as set forth while changing to a forward gear drive for the clutch-operating and gear-shifting members, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for reverse drive.

10. Change speed mechanism having in combination a driver shaft, a driven shaft, a clutch adapted to directly connect said shafts, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means functioning as set forth while changing to a forward gear drive, for the clutch-operating and gear-shifting members, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for reverse drive.

11. Change speed mechanism having in combination a driver shaft, a driven shaft, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means functioning as set forth while changing to a forward gear drive for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby, a striker carried by each bar, the striker of one bar being connected to the gear shifting member and the striker of the other bar being connected to the clutch-operating member, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for reverse drive.

12. Change speed mechanism having in combination a driver shaft, a driven shaft, a clutch adapted to directly connect said shafts, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means functioning as set forth while changing to a forward gear drive for the clutch-operating and gear-shifting members including a gear position indicator, a handle movable with reference to said indicator, an axis member, transmitting gearing transmitting motion from the handle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for reverse drive.

13. Change speed mechanism having in combination a driver shaft, a driven shaft, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means functioning as set forth while changing to a forward gear drive for the clutch-operating and gear-shifting members including a gear position indicator, a handle movable with reference to said indicator, an axis member, transmitting gearing transmitting motion from the handle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch-operating member, reversing gear, an independent control lever for moving the reversing gear for reverse drive, and a projection on said lever, the said disc having a recess disposed so that the projection enters the recess and locks said disc when the independent lever is operated for reverse.

14. Change speed mechanism having in combination a driver shaft, a driven shaft, a clutch adapted to directly connect said shafts, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means functioning as set forth while changing to a forward gear drive for the clutch-operating and gear-shifting members including a gear position indicator, a handle movable with reference to said indicator, an axis member, transmitting gearing transmitting motion from the handle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch-operating member, reversing gear, an independent control lever for moving the reversing gear for reverse drive, and a projection on said lever, the said disc having a recess disposed so that the projection enters the recess and locks said disc when the independent lever is operated for reverse.

15. Change speed mechanism having in combination a driver shaft, a driven shaft, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, trip gear mounted on said handle operating with a notched head of said column, adapted to assure a step by step movement of the handle through the different relative positions of the gear pairs and corresponding positions of the clutch, reversing gear, an independent control for moving the reversing gear, whereby a reverse drive is obtained though the driven shaft, and a locking member operated by the independent control to secure the controlling means for the clutch-operating and gear-shifting members against operation when the reversing gear is in position for reverse drive.

16. Change speed mechanism having in combination a driver shaft, a driven shaft, a clutch adapted to directly connect said shafts, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, trip gear mounted on said handle operating with a notched head of said column, adapted to assure a step by step movement of the handle through the different relative positions of the gear pairs and corresponding positions of the clutch, reversing gear, an independent control for moving the reversing gear, whereby a reverse drive is obtained through the driven shaft, and a locking member operated by the independent control to secure the controlling means for the clutch-operating and gear-shifting members against operation when the reversing gear is in position for reverse drive.

17. Change speed mechanism having in combination a driver shaft, a driven shaft, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a clutch, an operating member for the clutch to move it into and out of engagement with the clutch face of the loose wheel, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch-operating member, trip gear mounted on said handle operating with a notched head of said column, adapted to assure a step by step movement of the handle through the different relative positions of the gear pairs and corresponding positions of the clutch, reversing gear, an independent control lever for moving the reversing gear for reverse drive, and a projection on said lever, the said disc having a recess disposed so that the projection enters the recess and locks said disc when the independent lever is operated for reverse.

18. Change speed mechanism having in combination a driver shaft, a driven shaft, a clutch adapted to directly connect said shafts, a lay shaft, two pairs of gear wheels, each pair including one wheel on the lay shaft and one wheel on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch-operating member, trip gear mounted on said handle operating with a notched head of said column, adapted to assure a step by step movement of the handle through the different relative positions of the gear pairs and corresponding positions of the clutch, reversing gear, an independent control lever for moving the reversing gear for reverse drive, and a projection on said lever, the said disc having a recess disposed so that the projection enters the recess and locks said disc when the independent lever is operated for reverse.

19. Change speed mechanism having in combination a driver shaft, a driven shaft, a clutch adapted to directly connect said shafts, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel and vice versa, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, two cams fixed on said axis member, a bar associated with each cam for reciprocation thereby, a striker carried by each bar, the striker of one bar being connected to the gear-shifting member and the striker of the other bar being connected to the clutch-operating member, trip gear including a catch pivoted on the handle, a notched head for said column, each notch being chamfered off as set forth, a spring tending to push the catch into the notches, a cam face on the catch on the other side of its pivot to the notches, a lever pivoted on the handle, a spring pressed nose member pivoted on the lever, so that the nose thereof engages the cam face of the catch when the latter engages one of the said notches, means for operating said lever to cause the nose member to pass over said cam face to rock the catch to the chamfering of the notch, said chamfering being such that when the handle is rotated the catch is further rocked out of the notch by the chamfering engaging the catch, whereon the nose member is pressed by its spring clear of the said cam face to leave the catch free to be moved back by its spring into the successive notch as the movement of the control handle is continued, automatic means for immediately returning said nose member to engage said cam surface after it has cleared the latter, reversing gear, an independent control for moving the reversing gear, whereby a reverse drive is obtained through the driven shaft, and a locking member operated by the independent control to secure the controlling means against operation when the reversing gear is in position for reverse drive.

20. Change speed mechanism having in combination a driver shaft, a driven shaft, a clutch adapted to directly connect said shafts, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch-operating member, trip gear including a catch pivoted on the handle, a notched head for said column, each notch being chamfered off as set forth, a spring tending to push the catch into the notches, a cam face on the catch on the other side of its pivot to the notches, a lever pivoted on the handle, a spring pressed nose member pivoted on the lever, so that the nose thereof engages the cam face of the catch when the latter engages one of the said notches, means for operating said lever to cause the nose member to pass over said cam face to rock the catch to the chamfering of the notch, said chamfering being such that when the handle is rotated, the catch is further rocked out of the notch by the chamfering engaging the catch, whereon the nose member is pressed by its spring clear of the said cam face to leave the catch free to be moved back by its spring into the successive notch as the movement of the control handle is continued, automatic means for immediately returning said nose member to engage said cam surface after it has cleared the latter, reversing gear, an independent control lever for the reversing gear for reverse drive, and a projection on said lever, the said disc having a recess disposed so that the projection enters the recess and locks said disc when the independent lever is operated for reverse.

21. Change speed mechanism having in combination a driver shaft, a driven shaft, a clutch adapted to directly connect said shafts, a lay shaft, two pairs of gear wheels, each pair including one wheel on the lay shaft and the other on the driven shaft, a shifting member for obtaining relative movement into and out of engagement between the wheels of the pairs, a constant mesh gear connecting the driver and lay shafts including a loose wheel on the driver shaft, a clutch face on the loose wheel, a complementary face on said clutch, an operating member for the clutch to move it from an "in" position of direct drive through an intermediate "out" position to an "in" position where it engages the said loose wheel, controlling means functioning as set forth while changing to a forward gear drive for the clutch-operating and gear-shifting members including a gear position indicator, a handle movable with reference to said indicator, a spindle for the handle, a fixed column in which the spindle is mounted, an axis member, transmitting gearing transmitting motion from the handle spindle to the said axis member, a disc fixed on said axis member, a cam on each face of the disc, a bar associated with each cam for reciprocation thereby, a striker carried by each bar, the striker of one bar being connected to the gear-shifting member and the striker of the other bar being connected to the clutch operating member, trip gear including a catch pivoted on the handle, a notched head for said column, each notch being chamfered off as set forth, a spring tending to push the catch into the notches, a cam face on the catch on the other side of its pivot to the notches, a lever pivoted on the handle, a spring pressed nose member pivoted on the lever, so that the nose thereof engages the cam face of the catch when the latter engages one of the said notches, means for operating said lever to cause the nose member to pass over said cam face to rock the catch of the chamfering of the notch, said chamfering being such that when the handle is rotated the catch is further rocked out of the notch by the chamfering engaging the catch, whereon the nose member is pressed by its spring clear of the said cam face to leave the catch free to be moved back by its spring into the successive notch as the movement of the control handle is continued, automatic means for immediately returning said nose member to engage said cam surface after it has cleared the latter, two sidably mounted idler wheels fixed for rotation together, an independent control lever for moving said idler wheels so that one idler engages a wheel on the driven shaft and the other a wheel on the lay shaft when the said pairs are out of engagement, whereby a reverse drive is obtained through the driven shaft, and a projection on said lever, the said disc having a recess disposed so that the projection enters the recess and locks said disc when the independent lever is operated for reverse.

In testimony whereof I affix my signature.

JAMES FARLEY.